June 2, 1931. V. STEVES 1,808,383
PROPAGATING APPARATUS FOR MUSHROOM CULTURE
Filed Aug. 20, 1929
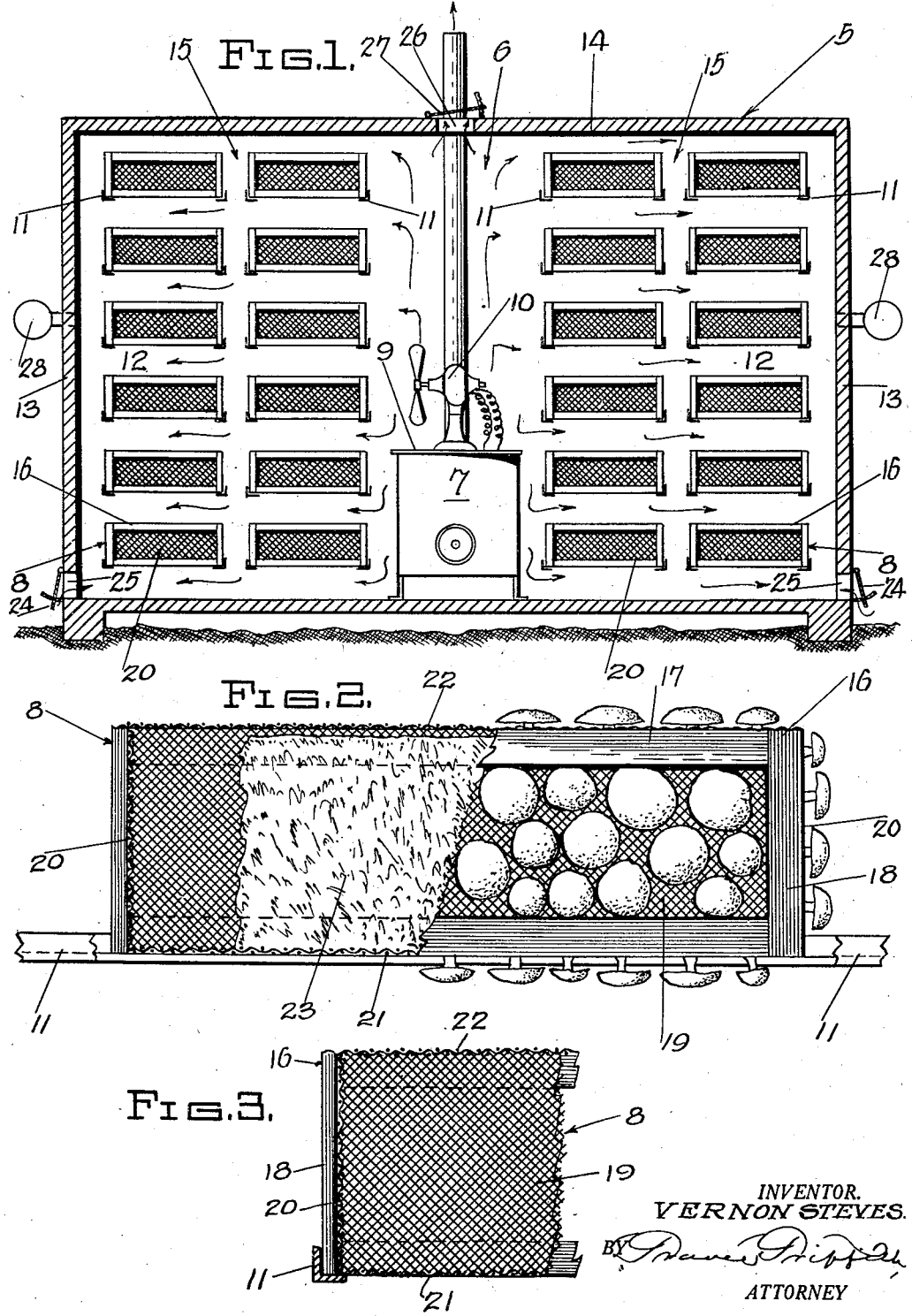
INVENTOR.
VERNON STEVES.
ATTORNEY Patented June 2, 1931

1,808,383

UNITED STATES PATENT OFFICE

VERNON STEVES, OF OLEUM, CALIFORNIA

PROPAGATING APPARATUS FOR MUSHROOM CULTURE

Application filed August 20, 1929. Serial No. 387,127.

This invention relates to propagating apparatus for mushroom culture in which the specially prepared mold or soil for their propagation is confined in screen-trays adapted to be cased in spaced relation in tier formation in darkened propagating rooms under properly controlled conditions as to temperatures and humidity, and has for its object to render the process more expeditious, and more productive at lessened cost.

The present application is a continuation in part of my co-pending application for process of mushroom culture, filed August 19, 1929, Patent No. 1,773,648.

In the culture of mushrooms, as ordinarily practiced, no particular attention has been given to the proper preparation of the soil, maintenance of suitable moisture conditions, temperature regulation, nor largely increased crops within restricted areas.

Instead of depending solely upon a single surface area for the growth of mushrooms, I employ trays of screen structure, in the utilization of which, all surfaces, tops, bottoms, sides and ends, contribute to the cultural area, the growths extending therethrough and beyond in all directions, thus providing an increased yielding area and a product freed from soil contaminations and in positions rendering the crop easily and readily harvested.

Mushrooms do best when grown in total darkness, admitting light only when working in the propagating room. But slight ventilation should be allowed in the room, as this will assist in preventing the undue escape of moisture from the air and provide those conditions so necessary to successful mushroom growing. However, care is to be taken not to reduce ventilation too greatly, as to do so would result in such a degree of precipitation as to cause water to drip from objects throughout the room. Nevertheless, it is important that the air be kept fresh, yet using as little ventilation as will permit the moisture in the soil to remain there for long periods without supplying additional water.

The accompanying drawings illustrate an apparatus suitable for the purpose of carrying out my process, in which:

Figure 1 is a vertical sectional view showing a propagating room having mounted therein in tiers a plurality of wire-mesh propagating trays, a centrally located heating element, and a suitable revolving blower fan, a vent also being shown leading from the heating element to the atmosphere;

Figure 2 is a side elevation partly in section illustrating the preferred form of wire-mesh propagating tray for use in connection with my process; and Figure 3 is a sectional detail of the same.

It is important in the growth of mushrooms that a temperature of not less than 53 degrees, nor more than 63 degrees, Fahrenheit, be constantly maintained in the propagating room. This is not a difficult temperature to be maintained, but, as the outer part of the room 5 will normally be at a much lower degree than that of the space 6 next to the heater 7, thereof, the actual mean temperature should be practically constant, or with but slight variations.

It is to be understood that in the growing of mushrooms, in accordance with my process, the right temperature must be maintained throughout the year, and that, ordinarily, the temperature for individual wire-mesh trays 8, should not vary more than three or four degrees during the entire time required for the development of the crop.

If the weather or climate is such that the normal temperature of the propagating room 5 is raised above sixty degrees, Fahrenheit, it will be necessary to install a suitable refrigerating means (not shown). An automatic refrigerating machine has proven to be particularly well adapted for this purpose, as it can be readily installed, either in the heating chamber of the heater 7, or placed on the top 9 thereof.

An electric fan 10 is operated in connection with the refrigerating machine, and in the same manner as if it were the heater that was being used. If the refrigerating machine is operated from top of heater, the fan 10 should be operated directly above it, that the cool air may be circulated freely throughout the entire room.

The tray department 12 of the propagating room 5 is filled with trays by placing them one above the other and setting them so that they will slide properly between the racks 11. As many of the racks may be placed in the room as there is possible space for, beginning a row about three feet from the walls 13, building it all the way down the room and reaching to within one foot of the ceiling 14 thereof, and building as many of these tiers as the height of the room will permit. A passageway 15 of three feet between the different sets of rows should be allowed. No trays should be placed closer than a distance of five feet from the heater 7 and chamber door of heated room.

All those trays occupying places in the warmest part of the room, or those that have been constantly subjected to temperatures of from 59 to 63 degrees Fahrenheit, should begin bearing mushrooms by the sixth week after spawning. Trays that have been subjected to greatly varying temperatures during the period of growth will not begin bearing for some time later. The trays in the cooler parts of the propagating room and under constantly maintained temperatures of from 53 to 59 degrees, usually begin bearing by the seventh or eighth week. If the temperatures of the room have varied some eight or ten degrees daily during this growing period, the bearing will not begin until after the eighth week, if it begins at all. Temperatures of wide variation are considered fatal to the growing spawn. A temperature below 53 degrees is much less harmful to the spawn than is one of above 63 degrees.

The specially designed trays 8 for use in connection with spawning the mushroom crop consist of wire mesh trays as illustrated in detail in Figures 2 and 3, and each embodies a frame 16, constructed of wood or metal parts and having longitudinal side members 17 and connecting uprights 18 forming a rectangular skeleton frame-work having sides, ends and bottom 19, 20 and 21, respectively, covered with open mesh screen through which the stems of the mushrooms extend.

The top section 22 is likewise a screen covering but is removable from the frame so that the prepared compost 23 for the propagation of the mushroom spawn may be properly packed in the trays previous to their insertion in the racks of the propagating room.

The racks 11 may be constructed of any suitable material, although preferably, and as here shown, they consist of spaced angle-bars, arranged in pairs, as shown in Figure 1, so that the trays may be readily placed thereon and slid rearwardly one at a time until the racks are filled. Each tray, of course, must be properly spaced from the preceding one to allow sufficient clearance between the ends thereof for propagation purposes and later plucking of the mushrooms.

The heater 7 may be of any suitable type, such as an electric unit, or it may be an ordinary kerosene unit, as used in chicken brooders, preferably the latter as the heater in this type of element is more easily regulated to maintain a uniform temperature.

The fan 10 is arranged to revolve about its vertical axis and in this manner thoroughly circulates the humid air within the chamber to and through all the trays 8, whether they be near the heater 7 or remote therefrom.

In order that the temperature of the propagating chamber 5 may be regulated to maintain a given steady temperature therein, ventilators 24 may be arranged to regulate the air intake openings 25 formed in the walls 13, and the roof of said chamber may be provided with an outlet opening 26 controllable by means of the ventilator 27.

Humidifiers 28 of any suitable form are arranged exteriorly of the chamber walls 13 and communicate with the interior of the chamber and are adapted to maintain a predetermined humidity within the propagating room, this humidity being regulated by means of any suitable instrument, such as a humidostat of any well known type.

Having thus described my invention, I claim, and desire to secure by Letters Patent:

1. An apparatus for growing mushrooms comprising a darkened closed propagating room, means for admitting air to said room, means in said room for maintaining a predetermined desired temperature therein, humidifiers associated therewith for supplying a predetermined degree of humidity therein, ventilating means therefor, a plurality of racks in pairs in said room, said racks being spaced on all sides form each other and from the walls of the room to provide ventilating passages, propagating trays arranged in and slidably supported by said racks, the walls of said trays having ventilating spaces therein, and means for continuously circulating the humidified air through the propagating trays.

2. In an apparatus for mushroom culture, a propagating tray for holding prepared soil comprising a skeleton frame-work and sides, ends and bottom secured to said frame, and a top section separable from the frame of the tray, the sides, ends, bottom and top of said tray being of open mesh material through which the growing spawn may penetrate.

In testimony whereof I hereby affix my signature this 9th day of August, 1929.

VERNON STEVES.